United States Patent [19]

Manson

[11] Patent Number: 4,790,265

[45] Date of Patent: Dec. 13, 1988

[54] CAT SCRATCHING POST AND EXERCISE CENTER

[76] Inventor: Blair R. Manson, 102 Spa Dr., Annapolis, Md. 21403

[21] Appl. No.: 74,220

[22] Filed: Jul. 16, 1987

[51] Int. Cl.⁴ ............................................. A01K 15/02
[52] U.S. Cl. ....................................................... 119/29
[58] Field of Search ................ 119/1, 29; 272/64, 113

[56] References Cited

U.S. PATENT DOCUMENTS

| | | | |
|---|---|---|---|
| 4,112,873 | 9/1978 | Van Zandt | 119/29 |
| 4,517,922 | 5/1985 | Lind | 119/29 |
| 4,577,590 | 3/1986 | Skroch | 119/29 |

FOREIGN PATENT DOCUMENTS

| | | | |
|---|---|---|---|
| 2433954 | 4/1980 | France | 272/113 |
| 8000252 | 8/1981 | Netherlands | 272/64 |

Primary Examiner—Robert P. Swiatek
Attorney, Agent, or Firm—Sughrue, Mion, Zinn, Macpeak & Seas

[57] ABSTRACT

A flat board forms a base member for supporting at longitudinally spaced, in line positions, a pair of posts which extend vertically upwardly therefrom and parallel to each other. A cylindrical cross bar is fixedly mounted at opposite ends to respective posts and spans horizontally between the posts at some distance above the base. Preferably the top surface of the base member and the side surface of the vertical posts are covered with carpeting. A small diameter object may be suspended by a string from the center of the cross bar at some height above the base so as to be freely swung by a cat in pendulum fashion.

7 Claims, 1 Drawing Sheet

CAT SCRATCHING POST AND EXERCISE CENTER

This invention relates to a cat scratching post covered with pile carpeting or the like, and more particularly to a combined cat scratching post and exercise center.

BACKGROUND OF THE INVENTION

Cats have an innate desire to sharpen their claws on most household articles of furniture, much to the dismay of the cat owner. Cats also have an affinity for scratching woven pile carpet to the extent of literally destroying selected areas of carpeting whether wall-to-wall or freely laid.

Cat scratching posts and exercise devices have been the subject of U.S. patents, see for example U.S. Pat. Nos. 3,993,027; 3,604,397; 3,479,990; 3,097,626; 3,085,551 and 2,997,019.

In current vogue is a cat scratching post in the form of an upright cylindrical wood member mounted to an underlying base and covered on its exterior with a piece of standard pile carpeting. Under such circumstances, the cat stands on its hind legs, with its body arched towards the carpet covered post and the cat rapidly scratches the surface of the pile carpet material. While such cat scratching post appears to be adequate and solves the cat's need for scratching to sharpen its claws, it provides little in the way of a device furthering exercise by the cat.

It is therefore, a primary object of the present invention to provide an improved cat scratching post which acts additionally as an exercise or fitness center permitting a variety of exercises to take the place limited only by the dexterity and imagination of the cat.

SUMMARY OF THE INVENTION

The present invention is directed to a combined cat scratching post and exercise center and comprises a horizontal base member and, a pair of posts fixedly mounted on the base member and standing vertically upwardly therefrom at laterally spaced, parallel positions with the posts generally parallel to each other. A wooden or other material rod is fixedly mounted at respective ends to respective posts, at some distance above the base and spans between the posts. The posts are preferably covered over a substantial length thereof with a woven pile-like material permitting the cat to scratch the pile-like material or, the cat may freely climb one post, cross over and descend the opposite post or hang on the cross bar. Preferably, the pile-like material constitutes a piece of woven pile carpet material. The base may comprise a flat board with the top of the base covered with the same pile-like material covering respective posts. The cross bar may constitute a relatively mall diameter wooden rod. Preferably, a string is fixed to the cross post at its center, being of a length less than the distance between the cross bar and the underlying base member and having an object fixed to the opposite end of the string such that the string and object function as a pendulum to be swung by the cat.

BRIEF DESCRIPTION OF THE FIGURES

FIG. 1 is a perspective view, partially broken away of the combined cat scratching post and exercise center forming a preferred embodiment of the invention with a cat hanging from the cross bar there of.

DESCRIPTION OF THE PREFERRED EMBODIMENT

Figure 1:
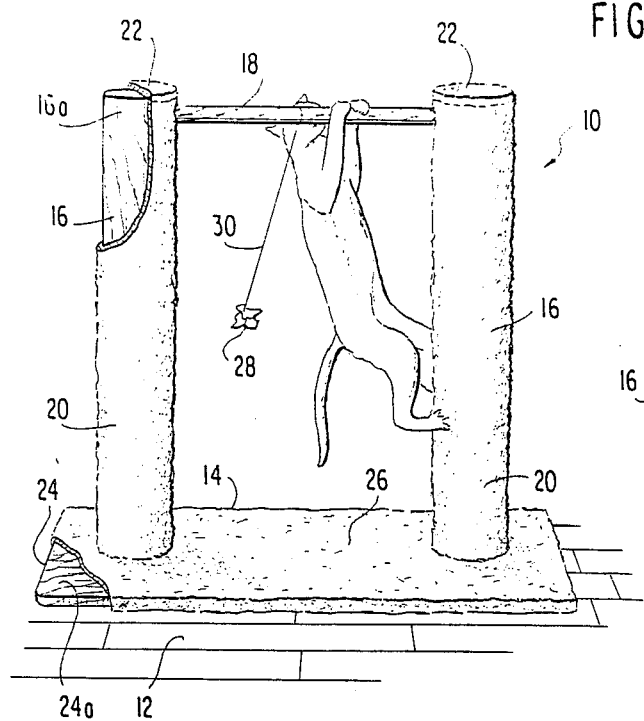
Figure 2:
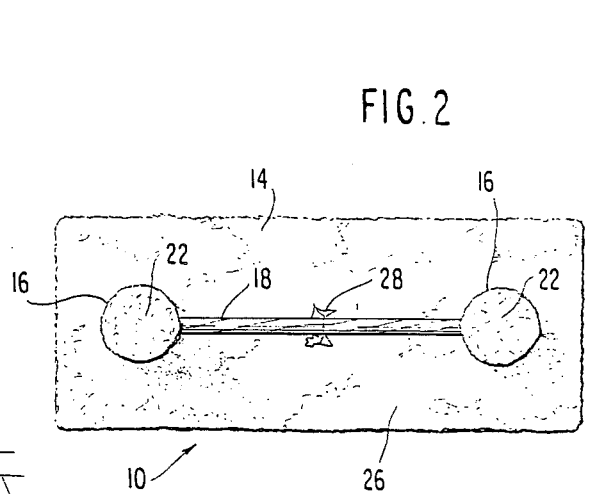
FIG. 2 is a top plan view thereof.

Referring to the drawings, the combined cat scratching post and exercise center is indicated generally at 10 and is shown as rested within the building on floor 12 by a base 14 which is of elongated plan rectangular form. Fixedly mounted to the base 14 are a pair of cylindrical, wooden posts indicated generally at 16 which are longitudinally spaced, and laterally centered on the base 14 so that they project upwardly from the base parallel to each other, in side by side position. Spanning the gap between the posts 16 and at the top 16a of the posts is a cross bar 18 whose opposite ends are fixed to respective posts 16. The cross bar 18 preferably takes the form of a wooden rod of circular cross section of relatively small diameter typically on the order of the size of a conventional broom handle. The posts may have a diameter of 4–5 inches. Preferably, the base 14 is formed of a wood board which may be several feet in length and a foot or so in width. The post 16 may be fixed to the base 14 by screws, nails or the like.

Since the unit 10 functions partially as a scratching post, both posts 16 are preferably covered over their complete vertical extent with a piece of woven pile-like material such as standard floor carpeting as at 20 which is of a length equal to the height of the vertical post 16. Further, a circular cap piece 22 of carpeting material is attached to the upper end of each wooden post so as to cover the top of each wooden post. The carpeting pieces may be affixed by carpet tacks, adhesive, nails or the like to the posts. Further, preferably, the base 14 comprises a wooden board 24 which is also covered at least on its top surface 24a with a rectangular piece of pile carpeting 26 having dimensions sized to that of the board or slightly in excess thereto both in terms of length and width so as to wrap over the edges of the board 24, at both sides and at opposite ends. Again the piece of carpeting 26 may be attached by adhesive or via carpet tacks, nails etc.

Preferably, a light weight object 28 is suspended from the cross bar 18 via a piece of string or cord 30, one end of which is tied to the cross bar at its center and the other end is tied to the light weight object 28. That object may be a piece of crumpled paper, a small cardboard box, a rubber ball or a similar element. The string and the lightweight object piece 28 form a pendulum which may be attacked, swung, etc, by the cat. As seen in FIG. 1, the cat may hang on the cross bar via its front legs and with its rear legs gripped to the carpet piece 20 covering the post to the right.

Figure 3:
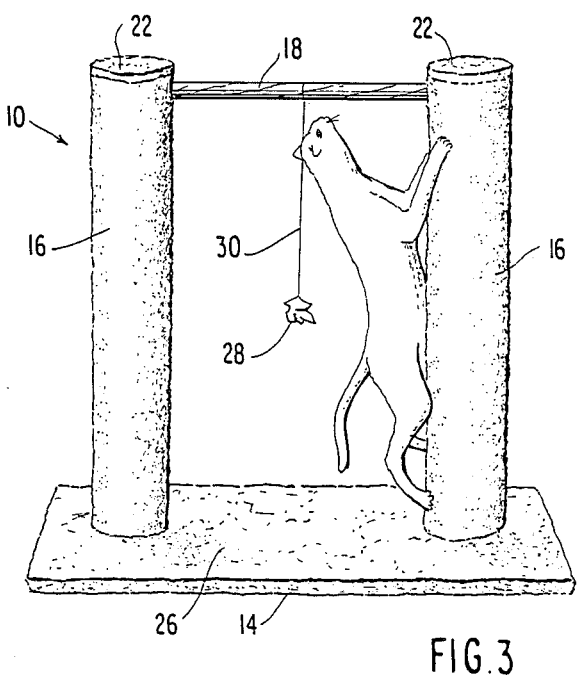
FIGS. 3 and 4 are further perspective views showing the type of exercise effected by a cat during use of the apparatus of FIGS. 1 and 2.
Figure 4:
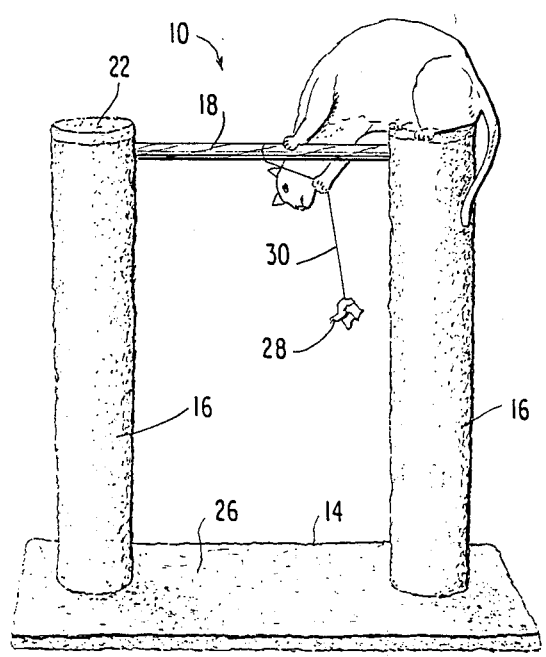

As seen in FIGS. 3 and 4, the cat can readily climb the post, straddle the cross bar 18, attack the pendulum from that position or swing on the cross bar. Likewise, the cat can stand on the base 24 and scratch the side of either post 16 in the manner of conventional cat scratching post.

By placing the cross bar 18 adjacent to the upper ends 16a of the two vertical posts 16, the cat, after climbing one post 16, can readily cross over to the opposite post via the cross bar 18. Further, by having the cross bar 18 formed of wood, whether of rectangular cross section or circular cross section, the cat can readily grip the surface of the cross bar when hanging on the same as indicated in FIG. 1 or when walking across the bar from post to post.

While the invention has been particularly shown and described with reference to a preferred embodiment thereof, it will be understood by those skilled in the art that various changes in the form and detail may be made therein without departing from the spirit and scope of the invention.

What is claimed is:

1. A combined cat scratching post and exercise center comprising:

a horizontal base member for placement on a building floor, a pair of posts fixedly mounted on the top of said base member and extending vertically, substantially perpendicularly upward therefrom to substantially equal heights and in laterally spaced, parallel positions, and a cross bar fixedly mounted at respective ends to respective posts at a position above said base and adjacent the post upper ends and spanning horizontally between said posts, said cross bar being in the form of a rod considerably smaller in diameter than the diameters of said posts, and wherein at least said posts are covered over a substantial vertical length thereof with woven pile-like material, whereby the cat can stand on the base and scratch the side of either post, or after climbing one post can walk across the bar from post to post or hang from the cross bar by its front legs with its rear legs gripping the pile material on one of the two vertical posts.

2. The combined cat scratching post and exercise center as claimed in claim 1 wherein said woven pile-like material consists of floor carpeting.

3. The combined cat scratching post and exercise center as claimed in claim 1 wherein said base comprises a flat board.

4. The combined cat scratching post and exercise center as claimed in claim 3 wherein, at least the top of said base is covered with said woven pile-like material.

5. The combined cat scratching post and exercise center as claimed in claim 1 wherein said cross bar is formed of wood.

6. The combined cat scratching post and exercise center as claimed in claim 1 wherein said base is formed of an elongated flat wooden board of rectangular plan configuration, said poles constitute wood cylinders and wherein said cross bar consists of a cylindrical wooden rod.

7. The combined cat scratching post and exercise center as claimed in claim 1 further comprising a short length of string fixed at one end to an object and at the other end to the center of said cross bar thereby forming a pendulum to be freely swung by a cat.

* * * * *